US010562185B2

(12) United States Patent
Naitou

(10) Patent No.: US 10,562,185 B2
(45) Date of Patent: Feb. 18, 2020

(54) ROBOT SYSTEM

(71) Applicant: FANUC CORPORATION, Yamanashi (JP)

(72) Inventor: Yasuhiro Naitou, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 102 days.

(21) Appl. No.: 15/901,098

(22) Filed: Feb. 21, 2018

(65) Prior Publication Data

US 2018/0304464 A1 Oct. 25, 2018

(30) Foreign Application Priority Data

Apr. 21, 2017 (JP) ................................ 2017-084465

(51) Int. Cl.
*B25J 9/16* (2006.01)
*B25J 13/08* (2006.01)

(52) U.S. Cl.
CPC ........... *B25J 9/1676* (2013.01); *B25J 9/1633* (2013.01); *B25J 9/1669* (2013.01); *B25J 9/1694* (2013.01);
(Continued)

(58) Field of Classification Search
CPC ...... B25J 9/1676; B25J 13/085; B25J 9/1633; B25J 19/06; B25J 9/0087; B25J 9/1674; B25J 9/1694; B25J 13/02; B25J 13/088; B25J 19/063; B25J 9/0081; B25J 9/1605; B25J 9/163; B25J 9/1669; B25J 9/1697; G05B 2219/40201; G05B 2219/40202;
(Continued)

(56) References Cited

U.S. PATENT DOCUMENTS

2012/0048027 A1 3/2012 Hashiguchi et al.
2014/0121837 A1 5/2014 Hashiguchi et al.
(Continued)

FOREIGN PATENT DOCUMENTS

CN 104742125 A 7/2015
CN 104908047 A 9/2015
(Continued)

OTHER PUBLICATIONS

Machine Translation of JP 2012/139769 (Year: 2012).*
(Continued)

*Primary Examiner* — Ryan Rink
(74) *Attorney, Agent, or Firm* — Maier & Maier, PLLC

(57) ABSTRACT

A robot system including a robot, a control unit, a sensor to detect a magnitude of force applied to the robot, a determination unit configured to determine, based on the magnitude of the detected force, whether there is application of an external force different from a load acting on the robot during a task performed by the robot, and a storage unit to store the magnitude of force detected by the sensor when the control unit executes at least one operation command when there is no application of the external force, in association with the operation command, where the determination unit determines, when the operation command is executed by the control unit, presence or absence of the external force based on the magnitude of force stored in the storage unit in association with the operation command and the magnitude of force detected by the sensor.

7 Claims, 6 Drawing Sheets

(52) U.S. Cl.
CPC ............ *B25J 13/085* (2013.01); *Y10S 901/09* (2013.01); *Y10S 901/31* (2013.01); *Y10S 901/46* (2013.01); *Y10S 901/49* (2013.01)

(58) Field of Classification Search
CPC .... G05B 19/19; G05B 19/404; G05B 19/406; G05B 2219/35473; G05B 2219/37428; G05B 2219/37526; G05B 2219/37538; G05B 2219/37582; G05B 2219/39312; G05B 2219/39325; G05B 2219/39413; G05B 2219/40198; G05B 2219/40559; G05B 2219/40582; G05B 2219/40587; G05B 2219/43203; G05B 2219/49102; G05B 2219/49205; G05B 2219/49206; G05B 2219/49209
See application file for complete search history.

(56) References Cited

U.S. PATENT DOCUMENTS

| | | | | |
|---|---|---|---|---|
| 2015/0112480 | A1* | 4/2015 | Nakata | B25J 19/06 700/245 |
| 2015/0177084 | A1 | 6/2015 | Inoue | |
| 2015/0258690 | A1 | 9/2015 | Naitou | |
| 2015/0314445 | A1 | 11/2015 | Naitou et al. | |
| 2015/0328771 | A1 | 11/2015 | Yuelai et al. | |
| 2016/0167231 | A1 | 6/2016 | Nakayama et al. | |
| 2016/0243705 | A1 | 8/2016 | Naitou et al. | |
| 2016/0279794 | A1 | 9/2016 | Inagaki et al. | |
| 2016/0279796 | A1 | 9/2016 | Naitou et al. | |
| 2017/0106542 | A1 | 4/2017 | Wolf et al. | |
| 2017/0185063 | A1 | 6/2017 | Suzuki et al. | |
| 2018/0093378 | A1* | 4/2018 | Yamamoto | B25J 9/1676 |
| 2018/0361578 | A1* | 12/2018 | Muneto | B25J 19/06 |

FOREIGN PATENT DOCUMENTS

| | | | |
|---|---|---|---|
| CN | 105082155 | A | 11/2015 |
| CN | 105904455 | A | 8/2016 |
| EP | 2422935 | A2 | 2/2012 |
| EP | 2572837 | A1 | 3/2013 |
| EP | 2572838 | A1 | 3/2013 |
| EP | 3 168 001 | A1 | 5/2017 |
| JP | H08-123529 | A | 5/1996 |
| JP | H10-133727 | A | 5/1998 |
| JP | H11-129142 | A | 5/1999 |
| JP | 2012-139769 | A | 7/2012 |
| JP | 2012-139772 | A | 7/2012 |
| JP | 2012-152843 | A | 8/2012 |
| JP | 2013-043232 | A | 3/2013 |
| JP | 2013-206086 | A | 10/2013 |
| JP | 5522403 | B2 | 4/2014 |
| JP | 2015-123520 | A | 7/2015 |
| JP | 5820013 | B1 | 11/2015 |
| JP | 2016-112627 | A | 6/2016 |
| JP | 2016-179510 | A | 10/2016 |
| JP | 2016-179527 | A | 10/2016 |
| WO | 2016/067874 | A1 | 5/2016 |

OTHER PUBLICATIONS

Japanese Office Action dated Dec. 18, 2018, in connection with corresponding JP Application No. 2017-084465 (7 pgs., including machine-generated English translation).

Japanese Search Report dated Nov. 7, 2018, in connection with corresponding JP Application No. 2017-084465 (17 pgs., including English translation).

"MPU-6050 sample program", Retrieved from the Internet, URL:https://denshikousakusenka.jimdo.com/電子部品/加速度-ジャイロセンサ/サンプルプログラム/: May 18, 2014; 4 pgs.

Office Action dated Jun. 18, 2019, in corresponding Chinese Application No. 201810342697.9; 10 pages.

* cited by examiner 1
2
7
3
FORCE SENSOR
STORAGE UNIT
5
DETERMINATION UNIT
6
CONTROL UNIT
4

FIG. 2

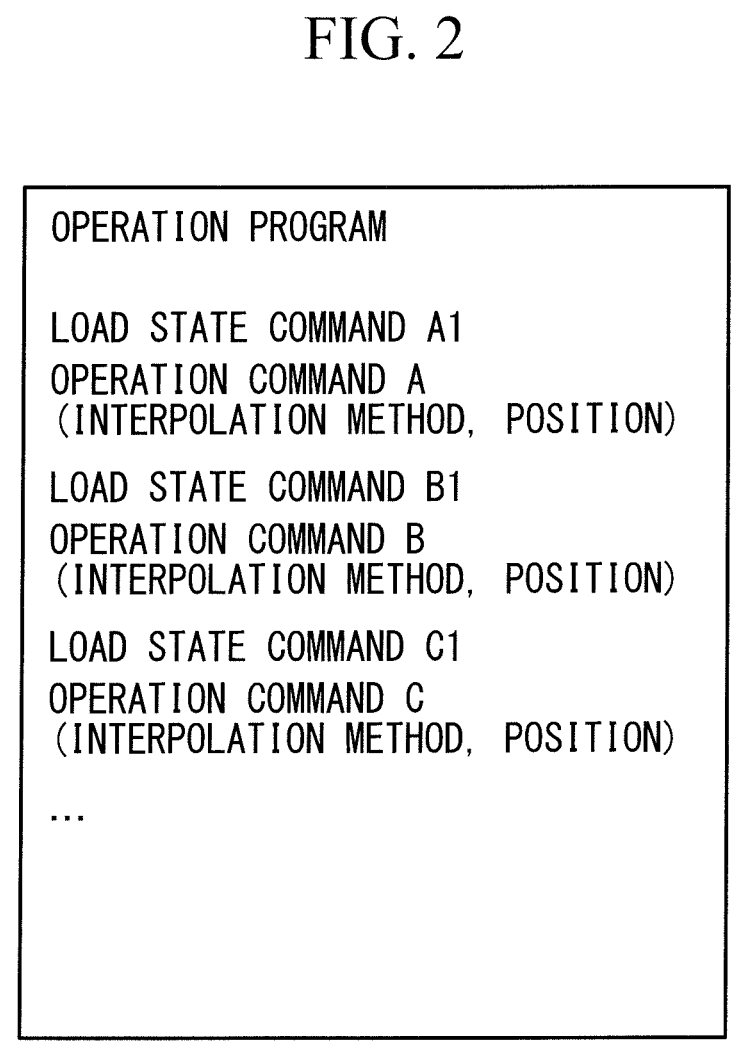

OPERATION PROGRAM

LOAD STATE COMMAND A1

OPERATION COMMAND A
(INTERPOLATION METHOD, POSITION)

LOAD STATE COMMAND B1

OPERATION COMMAND B
(INTERPOLATION METHOD, POSITION)

LOAD STATE COMMAND C1

OPERATION COMMAND C
(INTERPOLATION METHOD, POSITION)

...

ROBOT SYSTEM

CROSS-REFERENCE TO RELATED APPLICATIONS

This application is based on and claims priority to Japanese Patent Application No. 2017-084465 filed on Apr. 21, 2017, the content of which is incorporated herein by reference in its entirety.

FIELD

The present invention relates to a robot system.

BACKGROUND

Conventionally, as a robot system in which a load that is applied to a robot changes, there is known a robot system which is provided with a sensor for detecting a magnitude of a load to thereby detect a worker or the like coming into contact with a robot, where the robot system stores in a time-series manner values which are detected by the sensor when the robot is operated (for example, see Publication of Japanese Patent No. 5522403).

SUMMARY

An aspect of the present disclosure provides a robot system including a robot, a control unit configured to control the robot, a sensor configured to detect a magnitude of force that is applied to the robot, and a determination unit configured to determine, on a basis of the magnitude of the force detected by the sensor, whether or not there is application of an external force different from a load that acts on the robot during a task that is performed by the robot, wherein the control unit comprises a storage unit, the storage unit is configured to store the magnitude of the force detected by the sensor when the control unit executes at least one operation command included in an operation program for executing the task in a state where there is no application of the external force, and the storage unit is configured to store the magnitude of the force in association with the operation command, and wherein the determination unit determines, when the operation command in the operation program is executed by the control unit in a state where there is a possibility of application of the external force, presence/absence of the external force on the basis of the magnitude of the force that is stored in the storage unit in association with the operation command and the magnitude of the force that is detected by the sensor.

BRIEF DESCRIPTION OF DRAWINGS

FIG. 2 is a diagram showing an example of an operation program used by the robot system in FIG. 1.

DETAILED DESCRIPTION

A robot system 1 according to an embodiment of the present invention will be described below with reference to the drawings.

Figure 1:
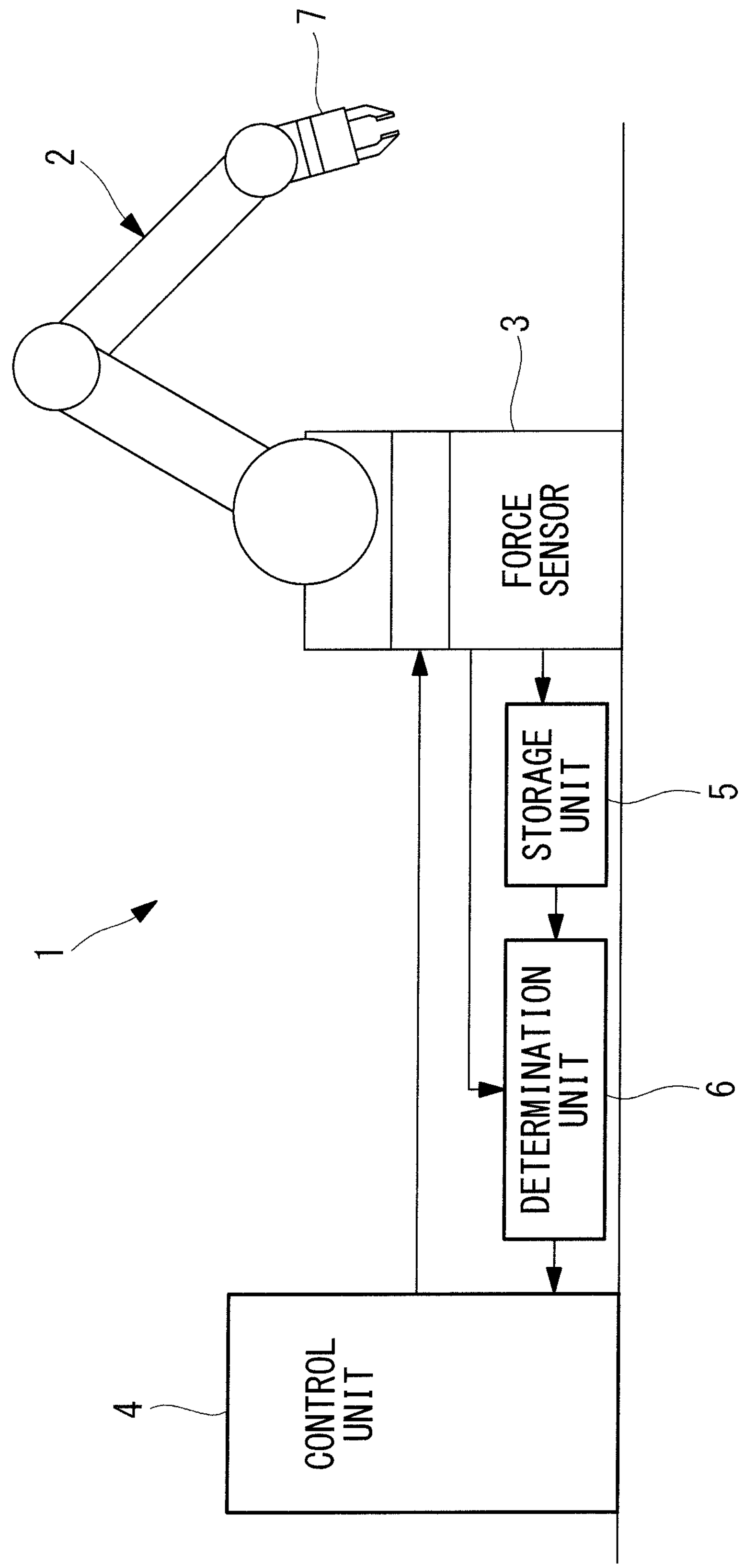
FIG. 1 is an overall configuration diagram schematically showing a robot system according to an embodiment of the present invention.

The robot system 1 according to the present embodiment is a system which operates with a human and a robot 2 sharing a work area with no safety fence, and as shown in FIG. 1, the robot system 1 includes the robot 2, a force sensor (sensor) 3 for detecting a magnitude of force (forces in three orthogonal axis directions and moments around three axes) acting on the robot 2, a control unit 4 for controlling the robot 2, a storage unit 5 for storing the magnitude of force detected by the force sensor 3, and a determination unit 6 for determining presence/absence of an external force acting on the robot 2, based on the magnitude of force stored in the storage unit 5 and the magnitude of the force detected by the force sensor 3.

In the example shown in FIG. 1, the robot 2 is an upright articulated type robot, but a robot 2 of any mode may be adopted.

The robot 2 is mounted on the force sensor 3, and the force sensor 3 detects the magnitude of force, including a load, that is applied to the robot 2. In the case where an end effector at a tip of the robot 2 is a hand 7 for grasping a workpiece, an external force that acts on the robot 2 from a human or the like when the human or the like comes into contact with the robot 2 may be detected, in addition to a load such as a weight of a workpiece or the like grasped by the hand 7.

The control unit 4 includes a processor (not shown) and a memory (not shown), and causes the robot 2 to operate according to a plurality of operation commands in an operation program which is taught in advance, by executing the operation program. The operation commands include a movement command to a teaching point, for example.

In the present embodiment, the control unit 4 is capable of executing a same operation program while switching between two modes of a storage mode and an execution mode.

Furthermore, in the present embodiment, as shown in FIG. 2, the operation program includes a plurality of load state commands (load state storage commands) A1, B1, C1, in addition to a plurality of operation commands A, B, C. The load state commands A1, B1, C1 are inserted at a plurality of positions in the operation program, and are executed in correspondence with adjacent operation commands A, B, C. That is, the load state command A1, B1, C1 executed immediately before or after operation of the robot by the operation command A, B, C by being placed before or after the operation command A, B, C.

Furthermore, at the time when the control unit 4 controls the robot 2 in the storage mode, the load state command A1, B1, C1 functions as a command for storing the magnitude of force detected by the force sensor 3 in the storage unit 5, and at the time when the control unit 4 controls the robot 2 in the execution mode, the load state command A1, B1, C1 functions as a command for causing the determination unit 6 to determine presence/absence of an external force by using the magnitude of force that is stored in the storage unit 5 at the time point of execution of the load state command A1, B1, C1.

The storage unit 5 is a memory, and stores the magnitude of forces detected by the force sensor 3 at the time of execution of the plurality of load state commands A1, B1 and C1 in the operation program in association with the load state commands A1, B1 and C1, that is, in association with the operation commands A, B and C corresponding to the load state commands A1, B1 and C1.

The determination unit 6 is a processor, and, at the time when the control unit 4 controls the robot 2 in the execution mode, the determination unit 6 calculates, by execution of the load state command A1, B1, C1, a difference between the magnitude of force stored in the storage unit 5 in association with the load state command A1, B1, C1 and the magnitude of force detected by the force sensor 3 at the time point of execution of the load state command A1, B1, C1, and determines that there is application of an external force, in the case where the difference exceeds a predetermined threshold.

The control unit 4 stops the robot 2 in a case where application of an external force is determined by the determination unit 6.

The operation of the robot system 1 according to the present embodiment configured in the above manner will be described below.

With the robot system 1 according to the present embodiment, an operator creates an operation program by performing a normal teaching operation. When creating the operation program, the load state commands A1, B1 and C1 are inserted before, after, or before and after the operation commands A, B and C at the time of description of the operation commands A, B and C regarding teaching of coordinates of a teaching point, movement to the teaching point, actuation of the hand 7, and the like.

Then, the storage mode is set first, and the operation program is executed. At this time, execution is performed in an environment where humans and other objects do not come into contact with the robot 2. The robot 2 moves through a plurality of teaching points which have been taught, according to the operation commands A, B and C, and actuates the hand 7 to grasp or handle a workpiece, and when the load state commands A1, B1 and C1 are executed at this time, the magnitude of forces detected by the force sensor 3 at the time points is stored in the storage unit 5.

Figure 3A:
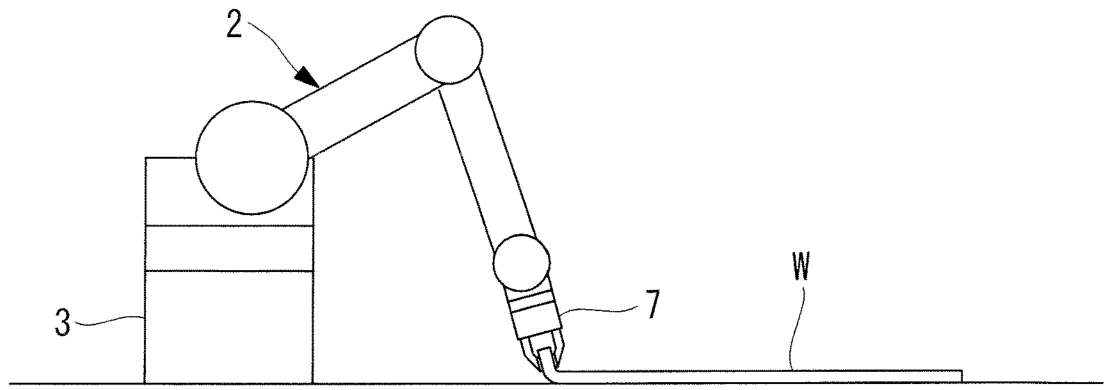
FIG. 3A is a diagram showing an example of an operation of the robot system in FIG. 1, which shows a state where a cable on a floor is gripped.
Figure 3B:
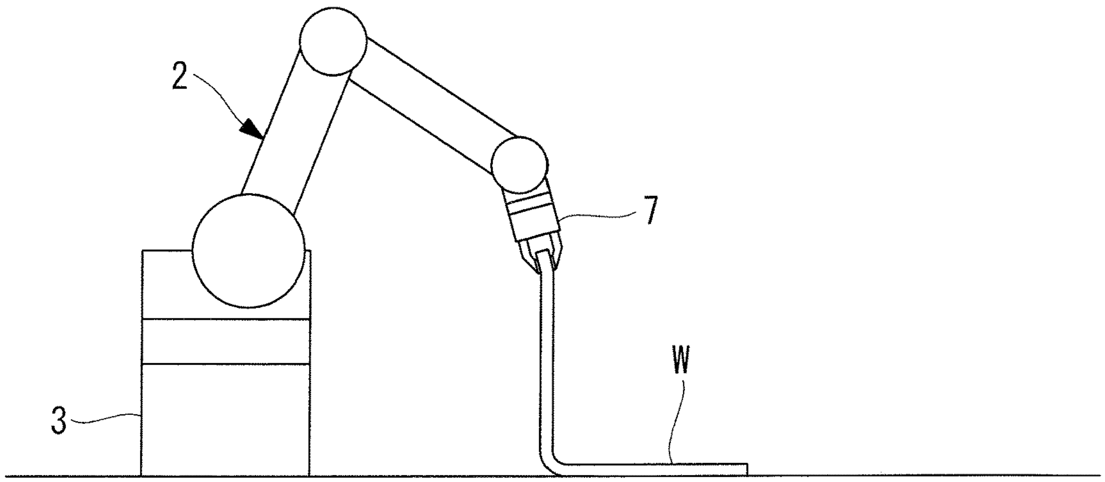
FIG. 3B is a diagram showing an example of an operation of the robot system in FIG. 1, which shows a state where the cable is half raised.
Figure 3C:
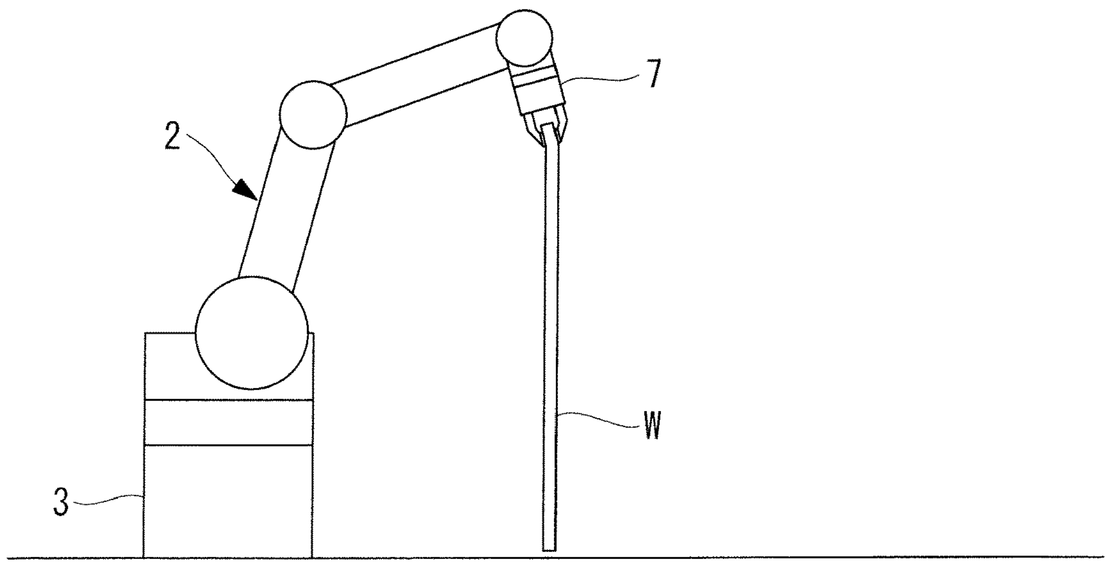
FIG. 3C is a diagram showing an example of an operation of the robot system in FIG. 1, which shows a state where the cable is fully raised.
Figure 4:
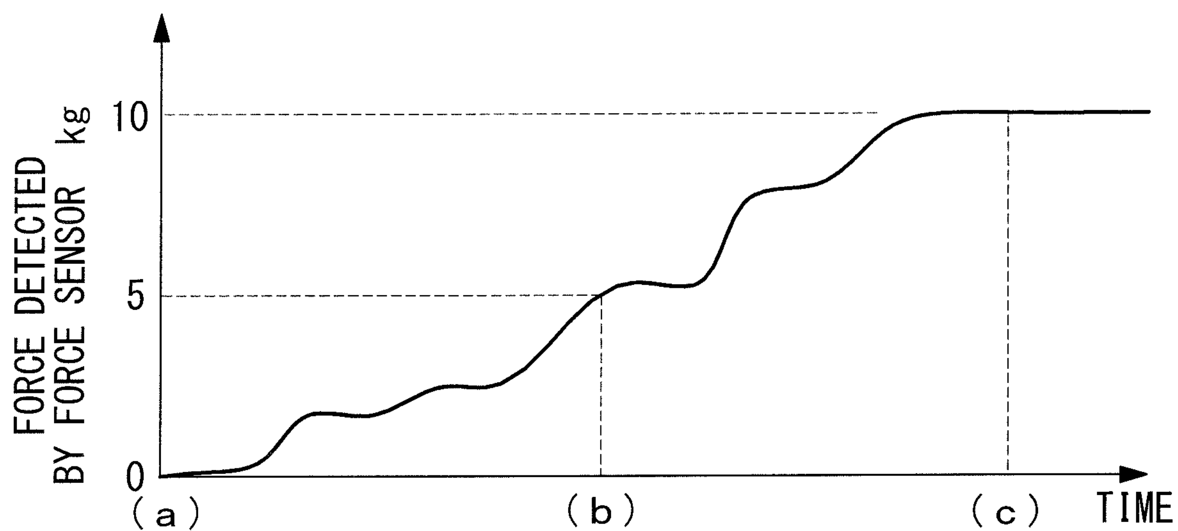
FIG. 4 is a diagram showing a time-series change in the magnitude of force detected by a sensor at a time of the operation in FIG. 3.

For example, a case of handling a long workpiece, such as a cable W, will be described as an example, as shown in FIGS. 3(*a*) to 3(*c*). In this case, a load applied to the robot 2 gradually fluctuates according to the length of the cable W that is held up, as shown in FIG. 4.

When assuming the weight of the cable W to be 10 kg, 0 kg is detected by the force sensor 3 in the state shown in FIG. 3(*a*), 5 kg is detected by the force sensor 3 in the state shown in FIG. 3(*b*), and 10 kg is detected by the force sensor 3 in the state shown in FIG. 3(*c*). The load state command A1, B1, C1 is executed at each time point in the states from FIGS. 3(*a*) to 3(*c*), and the magnitude of force detected by the force sensor 3 at each time point is stored in the storage unit 5.

When the operation program is completed in the storage mode, the mode is switched to the execution mode, and the operation program is executed. The robot 2 thus repeats the same operation as the operation in the storage mode, according to the operation commands A, B and C. When the load state commands A1, B1 and C1 are executed at this time, the magnitude of forces stored in the storage unit 5 is read from the storage unit 5 at respective time points.

Figure 5:
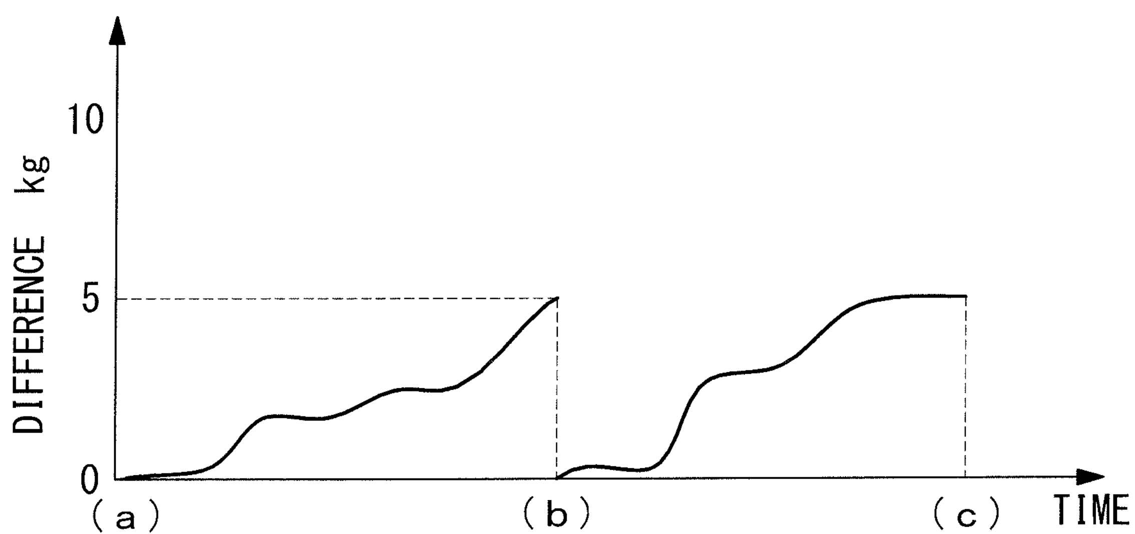
FIG. 5 is a diagram showing a difference between the magnitude of force in FIG. 4 and magnitude of force stored in a storage unit.

Then, the magnitude of force that is read out is subtracted by the determination unit 6 from the magnitude of force detected by the force sensor 3 and the difference is calculated, and whether the difference is greater than a predetermined threshold or not, that is, whether an external force of predetermined magnitude or more is applied or not, is determined. For example, in the example described above, an external force fluctuates in the manner shown in FIG. 5. By increasing the set number of load state commands A1, B1 and C1, an error may be reduced, and an external force may be accurately detected. In the case where application of an external force is determined by the determination unit 6, operation of the robot 2 is stopped by the control unit 4.

In this case, with the robot system 1 according to the present embodiment, a load that is applied to the robot 2 is stored in the storage unit 5 in the storage mode, in association with the operation command A, B, C in the operation program, and the magnitude of force detected in the execution mode is compared against the magnitude of force stored in the storage unit 5, and application of an external force may be accurately detected according to the difference. Particularly, there is an advantage that application of an external force may be accurately detected also in the case where the load gradually fluctuates, as with the above-described operation of gradually raising a long workpiece such as the cable W.

Furthermore, when a load that is applied to the robot 2 is stored in association with the operation command A, B, C, the timing of detection by the force sensor 3 and the timing of storage in the storage unit 5 are not shifted from each other in a time axis direction even if the operation speed of the robot 2 is changed. Accordingly, compared with a conventional method of storing the external force over time, there is an advantage that application of an external force may be accurately detected even if there is fluctuation in the operation speed of the robot 2.

Additionally, with the robot system 1 according to the present embodiment, the magnitude of force detected by the force sensor 3 at the time of execution of the load state command A1, B1, C1 in the storage mode is automatically stored in the storage unit 5 in association with the operation command A, B, C, but instead, an operator may input an appropriate value, without using the loading state command A1, B1, C1.

For example, the magnitude of force (forces in three orthogonal axis directions and moments around three axes) detected by the force sensor 3 is displayed on a teach pendant that is used at the time of teaching of the robot 2, and an operator may check the magnitude of force at the time of execution of the operation command A in the operation program, and input an appropriate value as the magnitude of force corresponding to the operation command A.

Moreover, the magnitude of force detected by the force sensor 3 is stored in association with the load state command A1, B1, C1 by executing the load state command A1, B1, C1 during execution of the operation program in the storage mode, but the magnitude of force may be stored in association with another operation command A, B, C, without inserting the load state command A1, B1, C1.

Furthermore, in the embodiment described above, the determination unit 6 determines presence/absence of an external force by calculating a difference between a detection value, stored in the storage unit 5, of the force sensor 3 at the time of execution of the load state command A1, B1, C1 and a detection value that is detected by the force sensor 3. Alternatively, determination during the operation command A, B, C by the determination unit 6 may be performed based on a difference to an average value of detection values of the force sensor 3 stored in the storage unit 5 in association with the load state commands A1, B1 and C1 before and after the operation command A, B, C.

Figure 6:
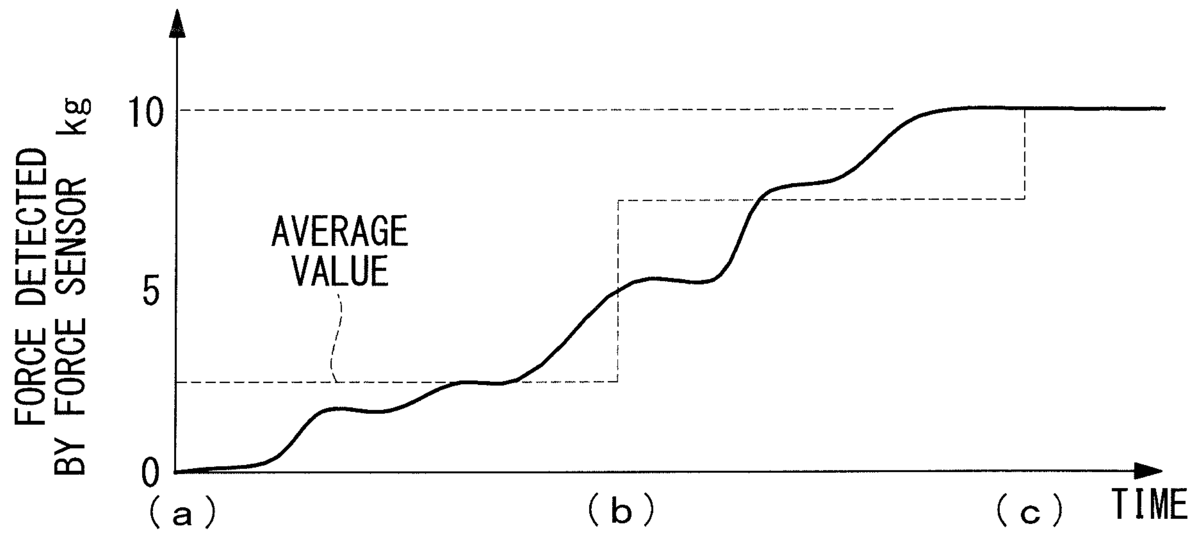
FIG. 6 is a diagram showing a modification of FIG. 4.
Figure 7:
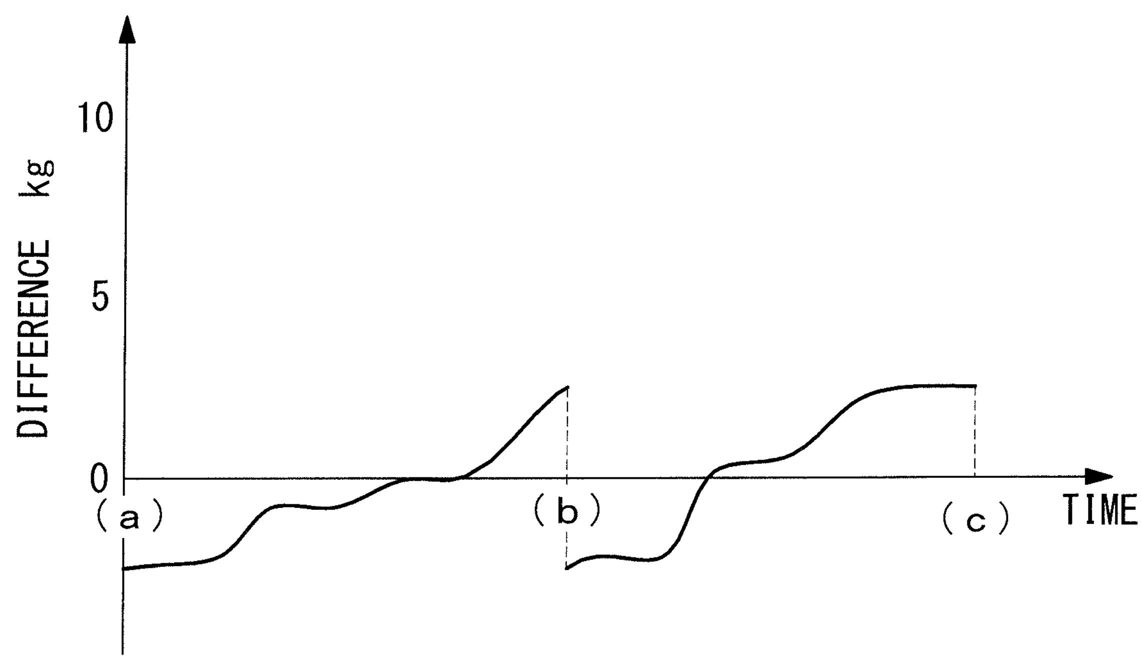
FIG. 7 is a diagram showing a modification of FIG. 5.

That is, in the example described above, the determination unit 6 may calculate an external force in the manner shown in FIG. 7, by using an average value as shown in FIG. 6. Accordingly, an error may be further reduced, and the external force may be accurately detected.

Figure 8:
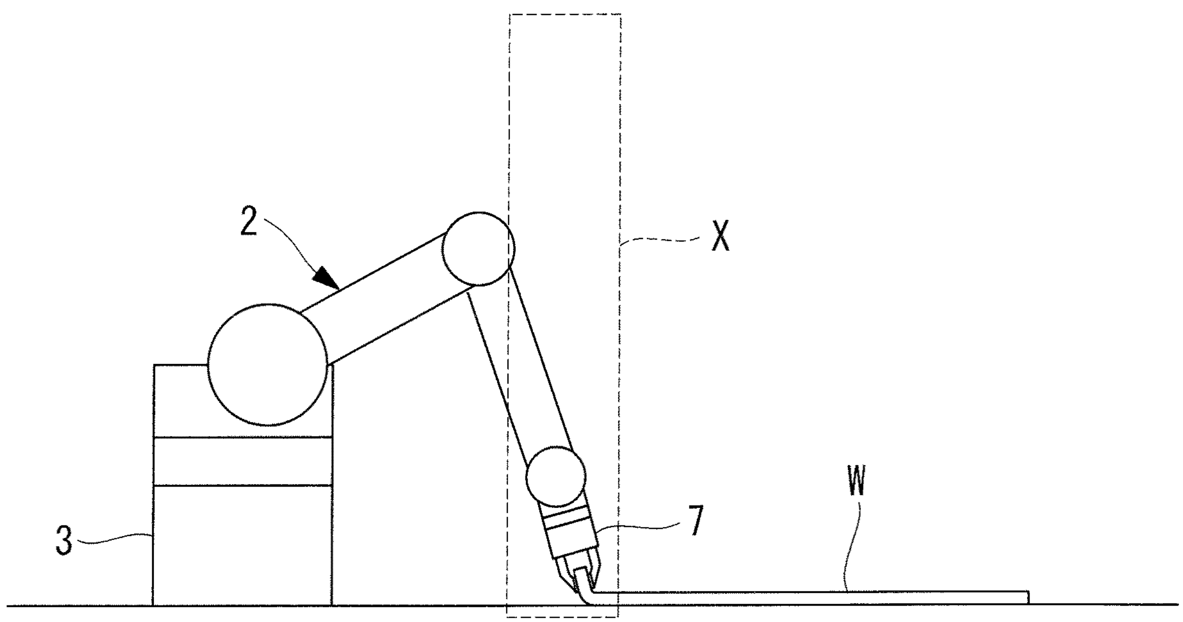
FIG. 8 is a diagram describing a determination region set in the robot system in FIG. 1.

Moreover, in the present embodiment, as shown in FIG. 8, a determination region setting unit (not shown) for setting a predetermined region (operation region of the robot 2) as a determination region X may be included. When the position of the robot 2 is outside the determination region X set by the determination region setting unit, the determination unit 6 may determine the magnitude of the force detected by the force sensor 3 as the external force.

In the case where the magnitude of force that is stored by execution of the load state command A1, B1, C1 due to teaching or an erroneous operation used in another operation, an external force cannot be appropriately detected, and thus, the magnitude of force that is stored is not to be used outside the determination region X so that the detection accuracy of the external force can be improved.

Furthermore, in this case, the control unit 4 may stop the robot 2 when the robot 2 is placed outside the determination region X, and a notification to the effect may be issued. Moreover, as the determination region X, a region where the robot 2 operated at the time of execution of the operation program in the storage mode may be automatically set.

Furthermore, in the present embodiment, when the external force calculated by the determination unit 6 exceeds a predetermined threshold, the robot 2 is stopped, and there may be provided a notification unit (not shown) which, instead, or in addition, issues a notification to the effect. By issuing a notification regarding contact of an object with the robot 2, surrounding workers including the operator may be made to recognize the contact state.

Furthermore, in the present embodiment, the determination unit 6 and the storage unit 5 are disposed outside the control unit 4, but this is not restrictive, and it is needless to say that the processor and the memory in the control unit 4 may be used as the determination unit 6 and the storage unit 5.

From the above-described embodiments, the following aspects of the present disclosure are derived.

An aspect of the present disclosure provides a robot system including a robot, a control unit configured to control the robot, a sensor configured to detect a magnitude of force that is applied to the robot, and a determination unit configured to determine, on a basis of the magnitude of the force detected by the sensor, whether or not there is application of an external force different from a load that acts on the robot during a task that is performed by the robot, wherein the control unit comprises a storage unit, the storage unit is configured to store the magnitude of the force detected by the sensor when the control unit executes at least one operation command included in an operation program for executing the task in a state where there is no application of the external force, and the storage unit is configured to store the magnitude of the force in association with the operation command, and wherein the determination unit determines, when the operation command in the operation program is executed by the control unit in a state where there is a possibility of application of the external force, presence/absence of the external force on the basis of the magnitude of the force that is stored in the storage unit in association with the operation command and the magnitude of the force that is detected by the sensor.

According to the present aspect, when at least one operation command in the operation program that is executed to cause the robot to perform a task is executed in a state where there is no application of an external force, the magnitude of force detected by the sensor is stored in the storage unit in association with the operation command. Then, when executing the operation command in the operation program in a state where there is a possibility of application of an external force, the magnitude of the force corresponding to the operation command is read from the storage unit by the determination unit, and also, presence/absence of an external force is determined based on the magnitude of the aforementioned force and the magnitude of force that is detected by the sensor at the time point.

Accordingly, even in a case where there is fluctuation in the load that is applied to the robot, presence/absence of an external force may be accurately detected by comparing the magnitude of a load without an external force and the magnitude of a load with an external force at each time point. In this case, because the magnitude of force detected by the sensor at the time of execution of each operation command is stored in the storage unit, a time axis of the magnitude of force which is a comparison target is not shifted even if the operation speed of the robot is changed, and an external force may be accurately detected.

In the aspect described above, the operation program may include a load state storage command in correspondence with the operation command, and the storage unit may store the magnitude of the force that is detected by the sensor when executing the load state storage command.

Accordingly, when the operation program is executed in a state where there is no application of an external force, the robot is operated by the operation command, and also, the load state storage command included in the operation program in correspondence with the operation command is executed, and the magnitude of the force detected by the sensor at the time point is stored in the storage unit.

Furthermore, in the aspect described above, the operation program may include load state storage commands before and after the operation command, and the storage unit may store an average value of the magnitude of the forces that are detected by the sensor when executing the load state storage commands before and after the operation command.

Accordingly, when the operation program is executed in a state where there is no application of an external force, the robot is operated by the operation command, and also, the load state storage commands, included in the operation program, before and after the operation command are executed, and an average value of the magnitude of forces detected by the sensor when executing the load state storage commands is stored in the storage unit. In the case where the load is greatly changed before and after an operation by the operation command, the detection accuracy of an external force that is applied to the robot may be improved by using the average value.

Furthermore, in the aspect described above, there may be included a determination region setting unit configured to set, as a determination region, an operation region of the robot including a position where the load state storage command is issued, where the determination unit may determine, as the external force, the magnitude of the force that is detected by the sensor when the robot is placed outside the determination region set by the determination region setting unit.

In the case where the operation command and the magnitude of force stored in the storage unit do not correspond to each other, if the external force is calculated by using the magnitude of the force that is stored, an error is increased, and thus, by restricting, to the determination region, the operation region where the magnitude of force stored in the storage unit is to be used for detection of an external force, the detection accuracy of an external force that is applied to the robot may be improved.

Furthermore, in the aspect described above, there may be included a determination region setting unit configured to set, as a determination region, an operation region of the robot including a position where the load state storage command is issued, where the control unit may stop the robot when the robot is placed outside the determination region set by the determination region setting unit.

In the case where the operation command and the magnitude of force stored in the storage unit do not correspond to each other, if the external force is calculated by using the magnitude of the force that is stored, an error is increased, and thus, by stopping the robot, the robot may be prevented from being operated in a state where an external force cannot be accurately detected.

Furthermore, in the aspect described above, the determination region setting unit may set the determination region at a time of storage of the magnitude of the force in the storage unit.

This allows the determination region where an external force is detected by using the magnitude of force stored in the storage unit to be easily set.

Furthermore, in the aspect described above, the control unit may stop operation of the robot in when the determination unit determines that the external force at or above a predetermined threshold is applied.

Furthermore, there may be included a notification unit which is configured to issue a notification when the determination unit determines that the external force at or above a predetermined threshold is applied.

According to the aforementioned aspects, the present disclosure may achieve an advantageous effect that, in a case where there is fluctuation in a load that is applied to a robot, an external force applied to the robot may be accurately detected even if there is fluctuation in a speed of the robot.

REFERENCE SIGNS LIST

1 robot system
2 robot
3 force sensor (sensor)
4 control unit
5 storage unit
6 determination unit
A, B, C operation command
A1, B1, C1 load state command (load state storage command)
X determination region

The invention claimed is:

1. A robot system comprising:

a robot;

a controller comprising a processor and a memory and configured to control the robot; and a sensor configured to detect magnitudes of forces that are applied to the robot, wherein the controller is configured to determine, on a basis of the magnitude of the forces detected by the sensor, whether or not there is application of an external force different from a load that acts on the robot during a task that is performed by the robot, wherein the controller is configured to store, in a storage mode, the magnitude of each of the forces detected by the sensor in a storage when the controller executes a plurality of operation commands included in an operation program for executing the task in a state where there is no application of the external force different from the load, and the controller is configured to store the magnitude of each of the forces in association with each of the operation commands, and wherein the controller is configured to determine, in an execution mode, a presence or absence of the external force different from the load on the basis of the magnitude of each of the forces that is stored in the storage in association with each of the operation commands and the magnitude of the force that is detected by the sensor when the plurality of operation commands are executed by the controller, wherein the operation program includes a plurality of load state storage commands respectively inserted at a plurality of positions which are before or after the operation commands, wherein the controller stores, in the storage mode, the magnitude of each of the forces that is detected by the sensor when executing the load state storage commands.

2. A robot system comprising:

a robot;

a controller comprising a processor and a memory to control the robot; and a sensor configured to detect magnitudes of forces that are applied to the robot, wherein the controller is configured to determine, on a basis of the magnitudes of the forces detected by the sensor, whether or not there is application of an external force different from a load that acts on the robot during a task that is performed by the robot, wherein the controller is configured to store, in a storage mode, the magnitudes of each of the forces detected by the sensor in a storage when the controller executes a plurality of operation commands included in an operation program for executing the task in a state where there is no application of the external force different from the load, and the controller is configured to store the magnitude of each of the forces in association with each of the operation commands, and wherein the controller is configured to determine, in an execution mode, a presence or absence of the external force different from the load on the basis of the magnitude of each of the forces that is stored in the storage in association with each of the operation commands and the magnitude of the force that is detected by the sensor when the plurality of operation commands are executed by the controller, wherein the operation program includes load state storage commands before and after the operation commands, and the storage stores an average value of the magnitude of the forces that are detected by the sensor when executing the load state storage commands before and after the operation commands.

3. A robot system comprising:

a robot;

a controller comprising a processor and a memory and configured to control the robot; and a sensor configured to detect magnitudes of forces that are applied to the robot, wherein the controller is configured to determine, on a basis of the magnitudes of the forces detected by the sensor, whether or not there is application of an external force different from a load that acts on the robot during a task that is performed by the robot, wherein the controller is configured to store, in a storage mode, the magnitudes of each of the forces detected by the sensor in a storage when the controller executes a plurality of operation commands included in an operation program for executing the task in a state where there is no application of the external force different from the load, and the controller is configured to store the magnitude of each of the forces in association with each of the operation commands, and wherein the controller is configured to determine, in an execution mode, a presence or absence of the external force different from the load on the basis of the magnitude of each of the forces that is stored in the storage in association with each of the operation commands and the magnitude of the force that is detected by the sensor when the plurality of operation commands are executed by the controller, wherein the controller is configured to set, as a determination region, an operation region of the robot including a position where the load state storage commands are executed, wherein the controller is configured to determine, as the external force, the magnitude of the force that is detected by the sensor when the robot is placed outside the determination region.

4. The robot system comprising:

a robot;

a controller comprising a processor and a memory and configured to control the robot; and a sensor configured to detect magnitudes of forces that are applied to the robot, wherein the controller is configured to determine, on a basis of the magnitudes of the forces detected by the sensor, whether or not there is application of an external force different from a load that acts on the robot during a task that is performed by the robot, wherein the controller is configured to store, in a storage mode, the magnitude of each of the forces detected by the sensor in a storage when the controller executes a plurality of operation commands included in an operation program for executing the task in a state where there is no application of the external force different from the load, and the controller is configured to store the magnitude of each of the forces in association with each of the operation commands, and wherein the controller is configured to determine, in an execution mode, a presence or absence of the external force different from the load on the basis of the magnitude of each of the forces that is stored in the storage in association with each of the operation commands and the magnitude of the force that is detected by the sensor when the plurality of operation commands are executed by the controller, wherein the controller is configured to set, as a determination region, an operation region of the robot including a position where the load state storage commands are executed, wherein the controller stops the robot when the robot is placed outside the determination region.

5. The robot system according to claim 3, wherein the controller is configured to set the determination region at a time of storage of the magnitude of each of the forces in the storage mode.

6. The robot system according to claim 1, wherein the controller stops operation of the robot when the controller determines that the external force at or above a predetermined threshold is applied.

7. The robot system according to claim 1, further comprising:

a notification unit configured to issue a notification when the controller determines that the external force at or above a predetermined threshold is applied.

* * * * *